(12) United States Patent
Roman (10) Patent No.: US 11,091,061 B2
(45) Date of Patent: Aug. 17, 2021

(54) MODULAR VEHICLE SEATS

(71) Applicant: Volvo Car Corporation, Gothenburg (SE)

(72) Inventor: Robert Roman, Torslanda (SE)

(73) Assignee: Volvo Car Corporation, Gothenburg (SE)

( * ) Notice: Subject to any disclaimer, the term of this patent is extended or adjusted under 35 U.S.C. 154(b) by 12 days.

(21) Appl. No.: 16/254,660

(22) Filed: Jan. 23, 2019

(65) Prior Publication Data

US 2020/0231067 A1   Jul. 23, 2020

(51) Int. Cl.
| | |
|---|---|
| *B60N 2/02* | (2006.01) |
| *B60N 2/809* | (2018.01) |
| *B60N 2/00* | (2006.01) |
| *B60N 2/16* | (2006.01) |
| *B60N 2/20* | (2006.01) |
| *B60N 2/50* | (2006.01) |
| *B60R 21/207* | (2006.01) |

(52) U.S. Cl.
CPC .......... *B60N 2/0232* (2013.01); *B60N 2/002* (2013.01); *B60N 2/16* (2013.01); *B60N 2/20* (2013.01); *B60N 2/502* (2013.01); *B60N 2/809* (2018.02); *B60R 21/207* (2013.01)

(58) Field of Classification Search
CPC .. B60N 2/0875; B60N 2/0881; B60N 2/0228; B60N 2/067; B60N 2/23; B60N 2/22; B60N 2/12; B60N 2/0818; B60N 2002/0236; B60N 2002/924
USPC ................................. 297/408, 468, 469, 313
See application file for complete search history.

(56) References Cited

U.S. PATENT DOCUMENTS

| | | |
|---|---|---|
| 5,547,259 A | 8/1996 | Fredrick |
| 5,671,976 A | 9/1997 | Fredrick |
| 6,554,365 B2 | 4/2003 | Karschin et al. |
| 6,648,392 B2 | 11/2003 | Fourrey et al. |
| 7,857,259 B2 | 12/2010 | Baatz et al. |

(Continued)

FOREIGN PATENT DOCUMENTS

| | | |
|---|---|---|
| DE | 102016102310 A1 | 8/2016 |
| TR | 201610309 A2 | 2/2017 |

OTHER PUBLICATIONS

May 18, 2020 European Search Report issued on International Application No. 20153067.
Information on Search Strategy.

*Primary Examiner* — Toan C To
(74) *Attorney, Agent, or Firm* — Clements Bernard Walker; Christopher L. Bernard (57) ABSTRACT

A modular vehicle seat assembly including: a seat bottom structure module adapted to be rigidly or translatably coupled to one of a seat base module and a structure of a vehicle, securely coupled to a seat bottom cushion carrier module, and rigidly or pivotably coupled to a seat back structure module; a seat back structure module adapted to be rigidly or pivotably coupled to the seat bottom structure module and securely coupled to a seat back cushion carrier module; the seat bottom cushion carrier module adapted to be securely coupled to the seat bottom structure module; and the seat back cushion carrier module adapted to be securely coupled to the seat back structure module. The modular vehicle seat assembly further including a seat base module adapted to be rigidly coupled to the structure of the vehicle and to the seat bottom structure module.

22 Claims, 12 Drawing Sheets

(56) References Cited

U.S. PATENT DOCUMENTS

| | | | |
|---|---|---|---|
| 8,764,113 B2 | 7/2014 | Smith et al. | |
| 8,870,119 B2 | 10/2014 | Baatz et al. | |
| 8,905,475 B2 | 12/2014 | Schenten et al. | |
| 9,676,312 B2 | 6/2017 | Kuhley et al. | |
| 9,849,856 B1 * | 12/2017 | Line | B60N 2/42745 |
| 9,889,773 B2 * | 2/2018 | Line | B60N 2/2222 |
| 10,011,204 B2 | 7/2018 | Line et al. | |
| 10,239,431 B2 * | 3/2019 | Line | B60N 2/682 |
| 10,279,714 B2 * | 5/2019 | Line | B60N 2/565 |
| 10,363,841 B1 * | 7/2019 | Santillan Gutierrez | B60N 2/0875 |
| 10,391,910 B2 * | 8/2019 | Line | B60N 2/682 |
| 2001/0005095 A1 | 6/2001 | Karschin et al. | |
| 2001/0050501 A1 | 12/2001 | Fourrey et al. | |
| 2005/0253430 A1 | 11/2005 | George et al. | |
| 2007/0080258 A1 | 4/2007 | Baatz et al. | |
| 2009/0189407 A1 | 7/2009 | Lewis, II | |
| 2010/0052356 A1 | 3/2010 | Lewis, II | |
| 2011/0068226 A1 | 3/2011 | Baatz et al. | |
| 2012/0049597 A1 * | 3/2012 | Brewer | B60N 2/06 297/313 |
| 2012/0062007 A1 * | 3/2012 | Telesco | B60N 2/508 297/313 |
| 2012/0267930 A1 | 10/2012 | Sharda et al. | |
| 2013/0020847 A1 | 1/2013 | Smith et al. | |
| 2013/0082504 A1 | 4/2013 | Archambault | |
| 2013/0140859 A1 * | 6/2013 | Yamaki | B60R 21/207 297/216.13 |
| 2014/0183918 A1 * | 7/2014 | Kaku | B60N 2/165 297/344.15 |
| 2014/0216242 A1 | 8/2014 | Lamparter et al. | |
| 2018/0281631 A1 | 10/2018 | Line et al. | |
| 2018/0345824 A1 * | 12/2018 | Akimoto | B60N 2/22 |
| 2019/0193611 A1 * | 6/2019 | Ketels | B60N 2/502 |

\* cited by examiner

MODULAR VEHICLE SEATS

TECHNICAL FIELD

The present invention relates generally to the automotive field. More specifically, the present invention relates to modular vehicle seats that can be rapidly assembled in numerous configurations tailored to different vehicle applications, across multiple vehicle platforms, including both traditional and autonomous driving (AD) platforms.

BACKGROUND ART

In general, vehicle seats are expensive and time consuming to design and develop. For a given vehicle application, a specific underlying seat structure is designed and crash tested before a "top hat," or finish package, and upholstery are selected and applied. This process requires relatively long lead times, especially when undertaken for every seating position in every vehicle platform. All seat components are ultimately dependent upon the underlying structure. This creates design limitations and requires expensive technical solutions, limiting "top hat" and upholstery flexibility and creativity.

For example, for a given vehicle platform, front buckets seats, a rear bench seat, optionally rear bucket seats, and optionally third row seats must typically be designed and developed, with different adjustment and comfort features built into each. For another vehicle platform, different front bucket seats, a different rear bench seat, optionally different rear bucket seats, and optionally different third row seats must typically be designed and developed, again with different adjustment and comfort features built into each. This is expensive and time consuming, especially as autonomous driving (AD) vehicles and the like with both front and rear facing seat configurations become a reality.

Thus, what is needed in the art is a modular concept, whereby seat modules are designed and developed and are usable across all vehicle platforms.

SUMMARY

The present invention provides such seat modules that are usable across all vehicle platforms so that specific seat configurations can rapidly be assembled in a vehicle. A common underlying structure is thereby provided, on which a unique "top hat," or finish package, and upholstery can then be applied. This "top hat" can be tailored to customer needs and demands, without limiting the common underlying structure. In other words, a common seat foundation is provided, from which many custom seats can be built for many vehicle platforms and applications. This is especially useful for both traditional and autonomous driving (AD) platforms. Seat commonality is provided for the smallest electric vehicle (EV) to the largest sport utility vehicle (SUV) to the most unconventional robot taxi. Modules, as opposed to finished seats, can be purchased from various suppliers and assembled as needed in a manufacturing facility, thereby saving expense and time.

In one exemplary embodiment, the modular vehicle seat assembly provided herein includes: a seat bottom structure module adapted to be rigidly or translatably coupled to one of a seat base module and a structure of a vehicle on a bottom side of the seat bottom structure module, securely coupled to a seat bottom cushion carrier module on a top side of the seat bottom structure module, and rigidly or pivotably coupled to a seat back structure module on one or more of a top side and a back side of the seat bottom structure module; a seat back structure module adapted to be rigidly or pivotably coupled to the seat bottom structure module on a bottom side of the seat back structure module, securely coupled to a seat back cushion carrier module on a front side of the seat back structure module, and translatably coupled to a head rest on a top side of the seat back structure module; the seat bottom cushion carrier module adapted to be securely coupled to the top side of the seat bottom structure module on a bottom side of the seat bottom cushion carrier module, wherein the seat bottom cushion carrier module includes a seat bottom cushion support member and a seat bottom cushion; and the seat back cushion carrier module adapted to be securely coupled to the front side of the seat back structure module on a back side of the seat back cushion carrier module, wherein the seat back cushion carrier module includes a seat back cushion support member and a seat back cushion. The modular vehicle seat assembly further includes a seat base module adapted to be rigidly coupled to the structure of the vehicle on a bottom side of the seat base module and to the seat bottom structure module on a top side of the seat base module.

In another exemplary embodiment, the modular vehicle seat method provided herein includes: rigidly or translatably coupling a seat bottom structure module to one of a seat base module and a structure of a vehicle on a bottom side of the seat bottom structure module, the seat bottom structure module adapted to be securely coupled to a seat bottom cushion carrier module on a top side of the seat bottom structure module and rigidly or pivotably coupled to a seat back structure module on one or more of a top side and a back side of the seat bottom structure module; rigidly or pivotably coupling a seat back structure module to the seat bottom structure module on a bottom side of the seat back structure module, the seat back structure module adapted to be securely coupled to a seat back cushion carrier module on a front side of the seat back structure module and translatably coupled to a head rest on a top side of the seat back structure module; securely coupling a bottom side of the seat bottom cushion carrier module to the top side of the seat bottom structure module, wherein the seat bottom cushion carrier module includes a seat bottom cushion support member and a seat bottom cushion; and securely coupling a back side of the seat back cushion carrier to the front side of the seat back structure module, wherein the seat back cushion carrier module includes a seat back cushion support member and a seat back cushion. The modular vehicle seat method also includes rigidly coupling a seat base module to the structure of the vehicle on a bottom side of the seat base module and to the seat bottom structure module on a top side of the seat base module.

In a further exemplary embodiment, the modular vehicle seat provided herein is produced by: rigidly or translatably coupling a seat bottom structure module to one of a seat base module and a structure of a vehicle on a bottom side of the seat bottom structure module, the seat bottom structure module adapted to be securely coupled to a seat bottom cushion carrier module on a top side of the seat bottom structure module and rigidly or pivotably coupled to a seat back structure module on one or more of a top side and a back side of the seat bottom structure module; rigidly or pivotably coupling a seat back structure module to the seat bottom structure module on a bottom side of the seat back structure module, the seat back structure module adapted to be securely coupled to a seat back cushion carrier module on a front side of the seat back structure module and translatably coupled to a head rest on a top side of the seat back structure module; securely coupling a bottom side of the seat bottom cushion carrier module to the top side of the seat bottom structure module, wherein the seat bottom cushion carrier module includes a seat bottom cushion support member and a seat bottom cushion; and securely coupling a back side of the seat back cushion carrier to the front side of the seat back structure module, wherein the seat back cushion carrier module includes a seat back cushion support member and a seat back cushion. The modular vehicle seat ia also produced by rigidly coupling a seat base module to the structure of the vehicle on a bottom side of the seat base module and to the seat bottom structure module on a top side of the seat base module.

BRIEF DESCRIPTION OF THE DRAWINGS

The present invention is illustrated and described herein with reference to the various drawings, in which like reference numbers are used to denote like assembly components/method steps, and in which.

DESCRIPTION OF EMBODIMENTS

The present invention provides seat modules that are usable across all vehicle platforms so that specific seat configurations can rapidly be assembled in a vehicle. A common underlying structure is thereby provided, on which a unique "top hat," or finish package, and upholstery can then be applied. This "top hat" can be tailored to customer needs and demands, without limiting the common underlying structure. In other words, a common seat foundation is provided, from which many custom seats can be built for many vehicle platforms and applications. This is especially useful for both traditional and autonomous driving (AD) platforms. Seat commonality is provided for the smallest electric vehicle (EV) to the largest sport utility vehicle (SUV) to the most unconventional robot taxi. Modules, as opposed to finished seats, can be purchased from various suppliers and assembled as needed in a manufacturing facility, thereby saving expense and time.

Figure 1:
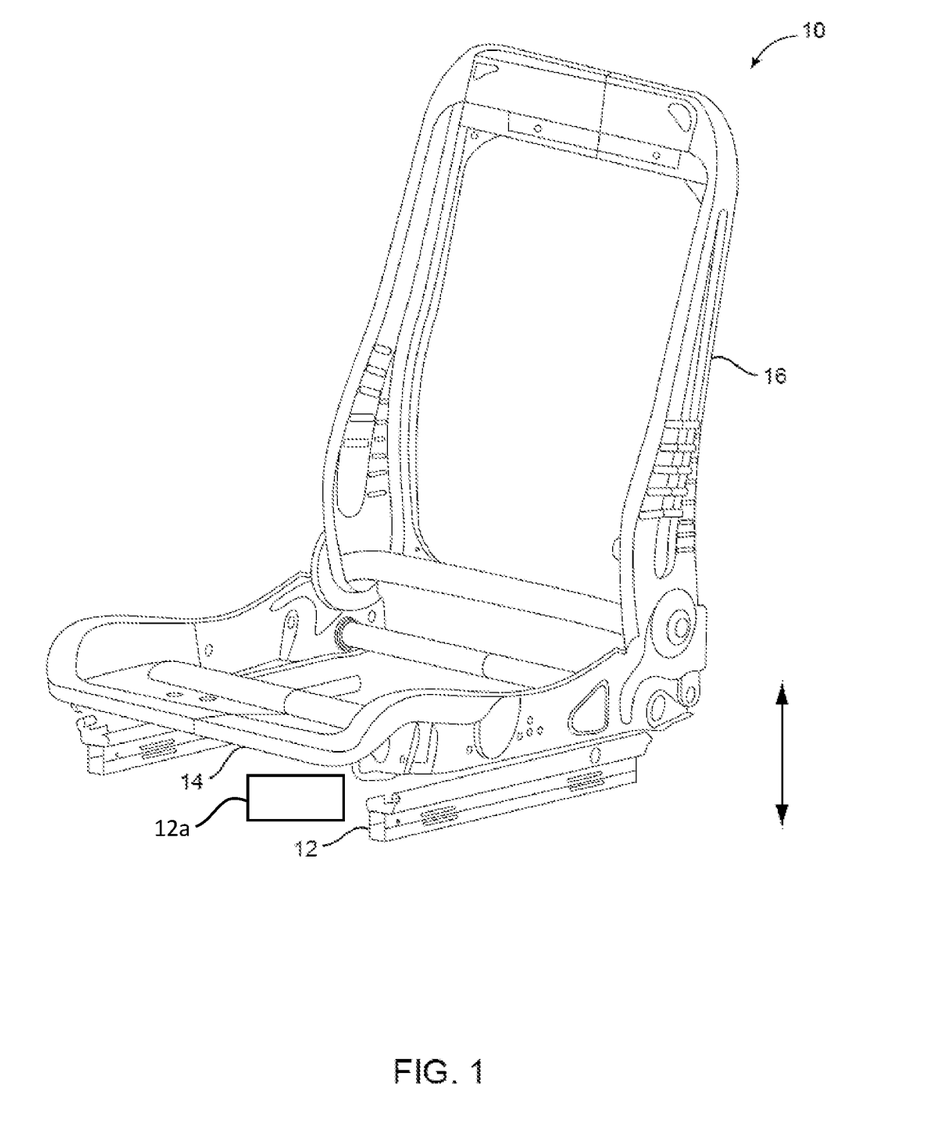
FIG. 1 is a schematic diagram illustrating one exemplary embodiment of the seat base module of the modular vehicle seat assembly provided herein.

Referring now specifically to FIG. 1, in one exemplary embodiment, the seat base module 12 of the modular vehicle seat assembly 10 includes a structural box or frame structure, made of metallic and/or plastic side members and cross members, that is adapted to be rigidly coupled to a structure (i.e., the floor) of a vehicle on a bottom side of the seat base module 12 and to the seat bottom structure module 14 on a top side of the seat base module 12. This seat base module 12 is not required in all modular vehicle seat assembly configurations only when a degree of height is required between the associated seat bottom structure module 14 and the floor of the vehicle. For example, the seat base module 12 is typically used in front seat and second row seat applications, but not in third row seat applications, or when a seat 10 is disposed on a tunnel, wheel well, or other structure. In such cases, the seat bottom structure module 14 is disposed directly on the underlying vehicle structure. Optionally, the seat base module 12 includes one of a mechanical and an electromechanical elevation mechanism 12a adapted to vary the height of the seat bottom structure module 14 with respect to one or more of the seat base module 12 and the underlying structure of the vehicle. Such elevation mechanisms 12a are well known to those of ordinary skill in the art and typically include a rotational or stepper motor coupled to an actuator mechanism, with a HALL sensor or the like used to enable seat memory functionality, for example. The seat base module 12 forms a discrete, unitary module, including the elevation mechanism 12a, that can be taken off the shelf and assembled into the vehicle using any conventional attachment means, such as bolts, mechanical fasteners, and the like. These modules 12 can come in large and small or wide and narrow configurations, for example, provided that a limited number of "one size fits all," "off-the-shelf" options are available. The modules 12 provide height accommodation and/or adjustment capability and/or functionality to the modular vehicle seat assembly 10. The seat base module 12 can also be equipped with means for accommodating z-thud deformation, as appropriate.

Figure 2:
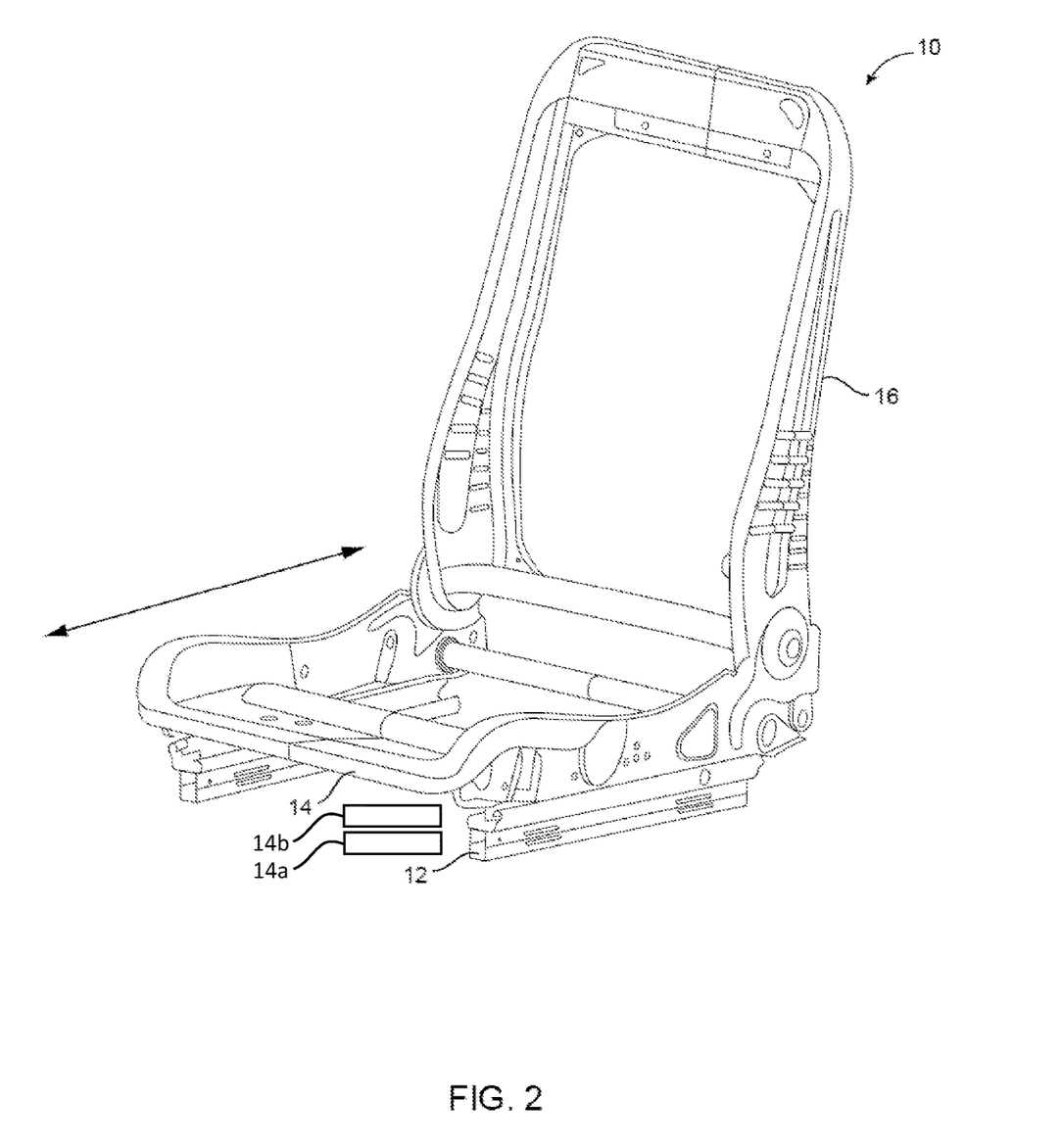
FIG. 2 is a schematic diagram illustrating one exemplary embodiment of the seat bottom structure module of the modular vehicle seat assembly provided herein.

Referring now specifically to FIG. 2, in one exemplary embodiment, the seat bottom structure module 14 of the modular vehicle seat assembly 10 is adapted to be rigidly or translatably coupled to one of the seat base module 12 and directly to the underlying structure of the vehicle on a bottom side of the seat bottom structure module 14. The seat bottom structure module 14 generally includes a metallic frame structure, including metallic and/or plastic side members and cross members. Again, the seat base module 12 is not required in all modular vehicle seat assembly configurations only when a degree of height is required between the associated seat bottom structure module 14 and the floor of the vehicle. For example, the seat base module 12 is typically used in front seat and second row seat applications, but not in third row seat applications, or when a seat 10 is disposed on a tunnel, wheel well, or other structure. In such cases, the seat bottom structure module 14 is disposed directly on the underlying vehicle structure. Optionally, the seat bottom structure module 14 includes one of a mechanical and an electromechanical translation mechanism 14a adapted to vary the forward/rearward position of the seat bottom structure module 14 with respect to one or more of the seat base module 12 and the underlying structure of the vehicle. Such translation mechanisms 14a are well known to those of ordinary skill in the art and typically include a rotational or stepper motor coupled to an actuator mechanism, with a HALL sensor or the like used to enable seat memory functionality, for example. The seat bottom structure module 14 also forms a discrete, unitary module, including the translation mechanism 14a, that can be taken off the shelf and assembled to the seat base module 12 using any conventional attachment means, such as bolts, mechanical fasteners, and the like. These modules 14 can also come in large and small or wide and narrow configurations, for example, provided that a limited number of "one size fits all," "off-the-shelf" options are available. The modules 14 provide width accommodation and/or translational adjustment capability and/or functionality to the modular vehicle seat assembly 10. The seat bottom structure module 14 is adapted to be securely coupled to a seat bottom cushion carrier module (not illustrated) on a top side of the seat bottom structure module 14, and rigidly or pivotably coupled to the seat back structure module 16 on one or more of a top side and a back side of the seat bottom structure module 14. Optionally, the seat bottom structure module 14 further includes a vibration damper mechanism 14b adapted to dampen vibration of the seat bottom structure module 14 with respect to the one of the seat base module 12 and the structure of the vehicle.

Figure 3:
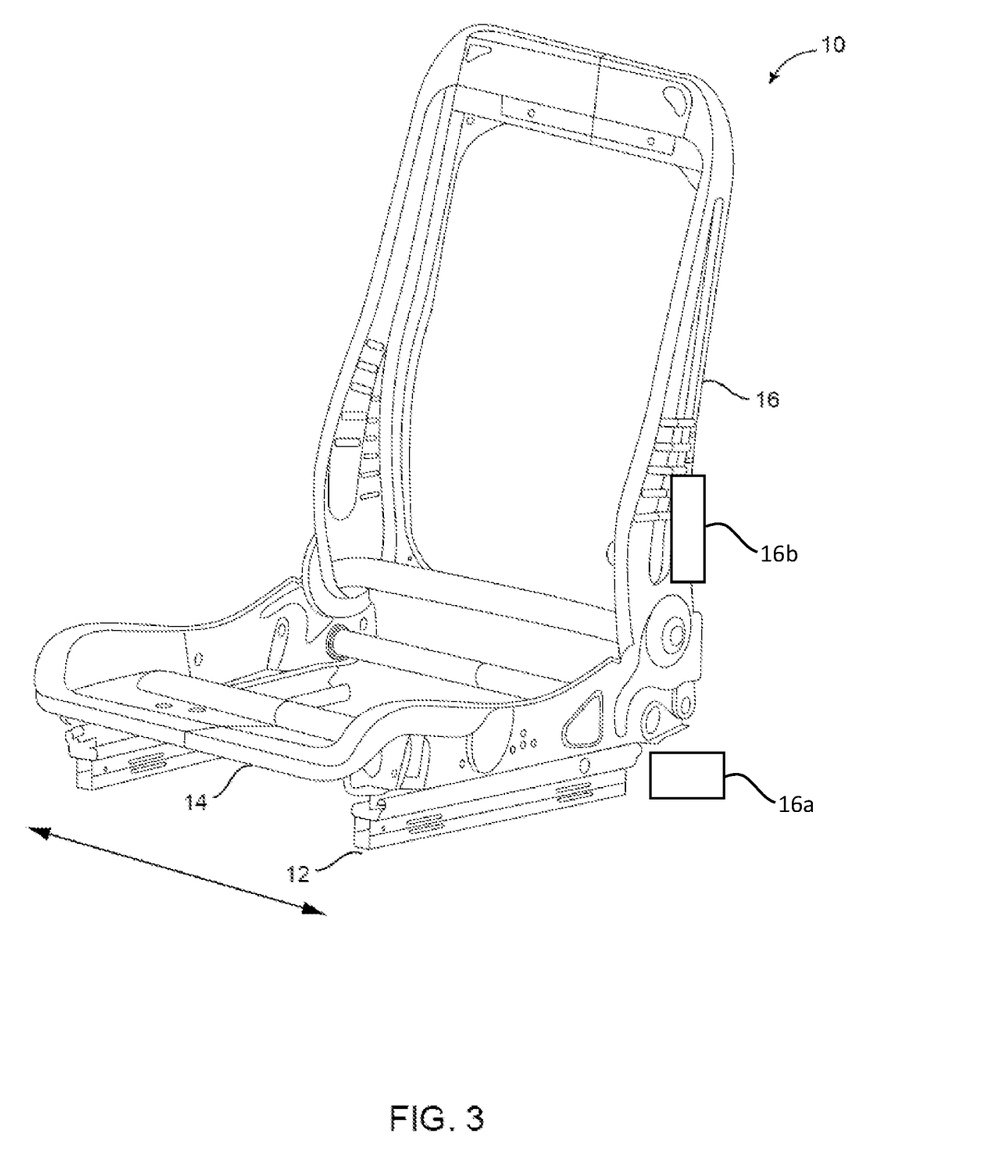
FIG. 3 is a schematic diagram illustrating one exemplary embodiment of the seat back structure module of the modular vehicle seat assembly provided herein.

Referring now specifically to FIG. 3, in one exemplary embodiment, the seat back structure module 16 of the modular vehicle seat assembly 10 is adapted to be rigidly or pivotably coupled to the seat bottom structure module 14 on a bottom side of the seat back structure module 16, securely coupled to a seat back cushion carrier module (not illustrated) on a front side of the seat back structure module 16, and translatably coupled to a head rest (not illustrated) on a top side of the seat back structure module 16. The seat back structure module 16 generally includes a metallic frame structure, including metallic and/or plastic side members and cross members. Optionally, the seat back structure module 16 includes one of a mechanical and an electromechanical reclining and/or folding mechanism 16a adapted to vary the reclining and/or folding angle of the seat back structure module 16 with respect to the seat bottom structure module 14. Such reclining and/or folding mechanisms 16a are well known to those of ordinary skill in the art and typically include a rotational or stepper motor coupled to an actuator mechanism, with a HALL sensor or the like used to enable seat memory functionality, for example. The seat back structure module 16 also forms a discrete, unitary module, including the reclining and/or folding mechanism 16a, that can be taken off the shelf and assembled to the seat bottom structure module 14 using any conventional attachment means, such as bolts, mechanical fasteners, and the like. These modules 16 can also come in large and small or wide and narrow configurations, for example, provided that a limited number of "one size fits all," "off-the-shelf" options are available. The modules 16 provide width accommodation and/or reclining/folding adjustment capability and/or functionality to the modular vehicle seat assembly 10. The seat back structure module 16 is adapted to be securely coupled to a seat back cushion carrier module (not illustrated) on a front side of the seat back structure module 16, and rigidly or pivotably coupled to the seat bottom structure module 14 on one or more of a top side and a back side of the seat bottom structure module 14. The head rest coupled to the seat back structure module 16 can be fixed or adjustable, and can incorporate whiplash protection functionality, well known to those of ordinary skill in the art. An air bag module 16b can also be coupled to either or both sides of the seat back structure module 16. Generally, the seat back structure module 16 is configured to receive a seat back cover (not illustrated), typically including a plastic "top hat" structure, on a back side thereof Referring now specifically to FIG. 4, in one exemplary embodiment, the seat bottom cushion carrier module 18 is adapted to be securely coupled to the top side of the seat bottom structure module 14 (FIGS. 1-3) on a bottom side of the seat bottom cushion carrier module 18. The seat bottom cushion carrier module 18 includes a seat bottom cushion support member, including a metallic or plastic support frame, and a foam seat bottom cushion. Optionally, the seat bottom cushion carrier module 18 is pre-upholstered off-the-shelf. The seat bottom cushion carrier module 18 is coupled to the seat bottom structure module 14 using conventional straps or the like, well known to those of ordinary skill in the art. Advantageously, the seat bottom cushion carrier module 18 includes one or more interior portions and/or surfaces for receiving functional modules (not illustrated) therein or thereon. The functional modules can include, but are not limited to, a tilt module operable for tilting the cushion carrier 18, an extension module operable for extending a front portion of the cushion carrier 18, a heat module, a ventilation module, an occupant detection module operable for detecting an occupant seated on the cushion carrier 18, a massage module, an integrated child safety seat module, and an armrest module. In this manner, the cushion carrier 18 can be customized with functional modules that are rapidly coupled thereto and accommodate any desired application.

Figure 5:
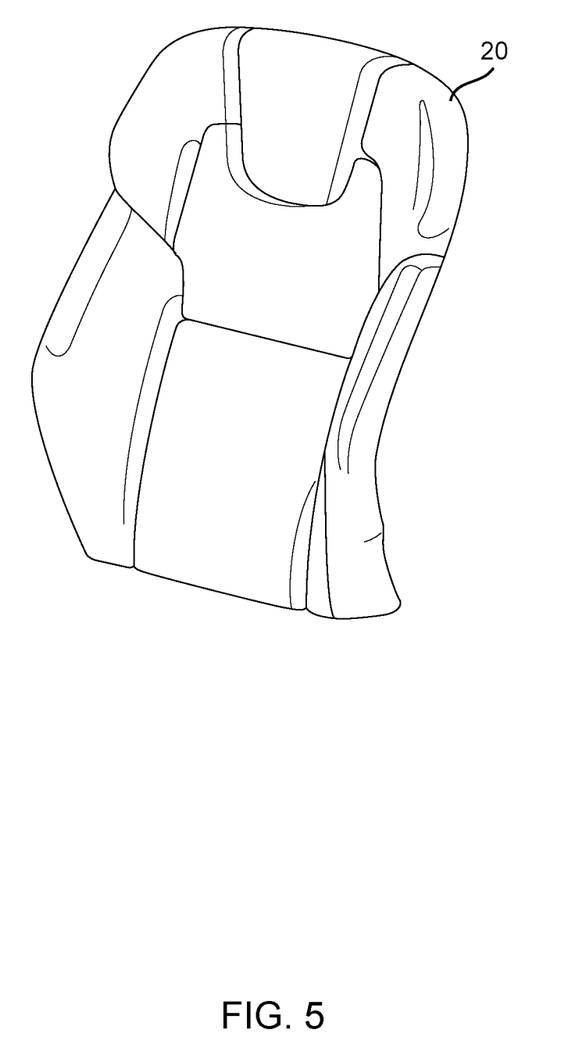
FIG. 5 is a schematic diagram illustrating one exemplary embodiment of the seat back cushion carrier module of the modular vehicle seat assembly provided herein.

Referring now specifically to FIG. 5, in one exemplary embodiment, the seat back cushion carrier module 20 is also adapted to be securely coupled to the front side of the seat back structure module 16 (FIGS. 1-3) on a back side of the seat back cushion carrier module 20. The seat back cushion carrier module 20 includes a seat back cushion support member, including a metallic or plastic support frame, and a foam seat back cushion. Optionally, the seat back cushion carrier module 20 is pre-upholstered off-the-shelf. The seat back cushion carrier module 20 is coupled to the seat back structure module 16 using conventional straps or the like, well known to those of ordinary skill in the art. Advantageously, the seat back cushion carrier module 20 includes one or more interior portions and/or surfaces for receiving functional modules (not illustrated) therein or thereon. The functional modules can include, but are not limited to, an extension module operable for extending side portions of the cushion carrier 20, a heat module, a ventilation module, an occupant detection module operable for detecting an occupant seated on the cushion carrier 20, a lumbar support module, a massage module, an integrated child safety seat module, and an armrest module. In this manner, this cushion carrier 20 can also be customized with functional modules that are rapidly coupled thereto and accommodate any desired application.

Figure 6:
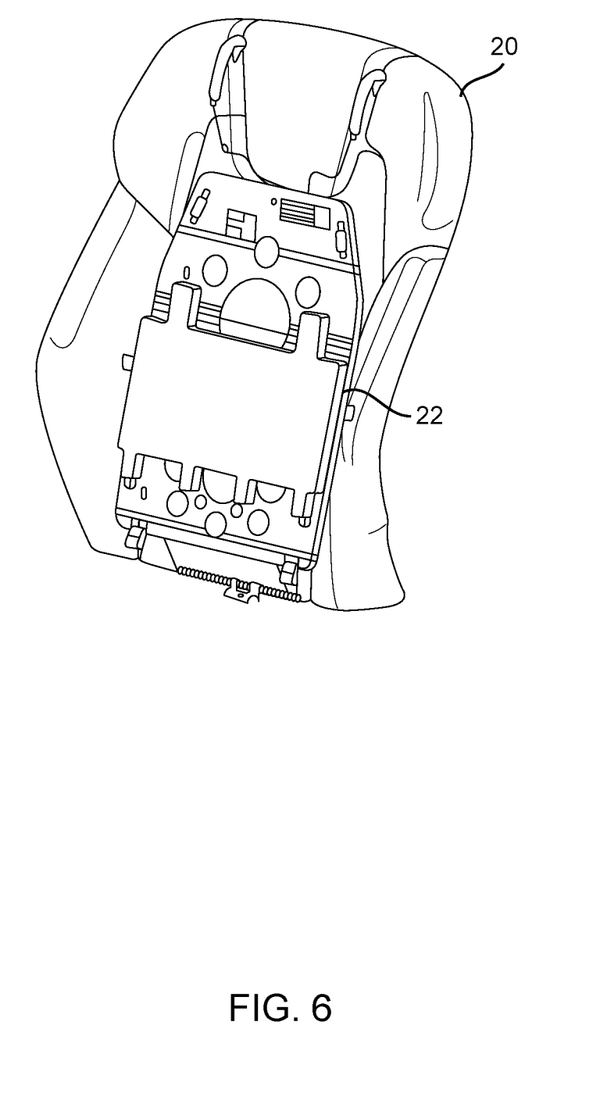
FIG. 6 is a schematic diagram illustrating one exemplary embodiment of the functional insert module of the modular vehicle seat assembly provided herein.

FIG. 6 illustrates an exemplary functional module 22 engaged with the seat back cushion carrier module 20. It should be noted that, ultimately, upholstery covers the seat back cushion carrier module 20 and engaged functional module 22, and any conventional electrical connections can be made from the functional module 22 to other modules and/or vehicle structures and/or systems.

Figure 4:
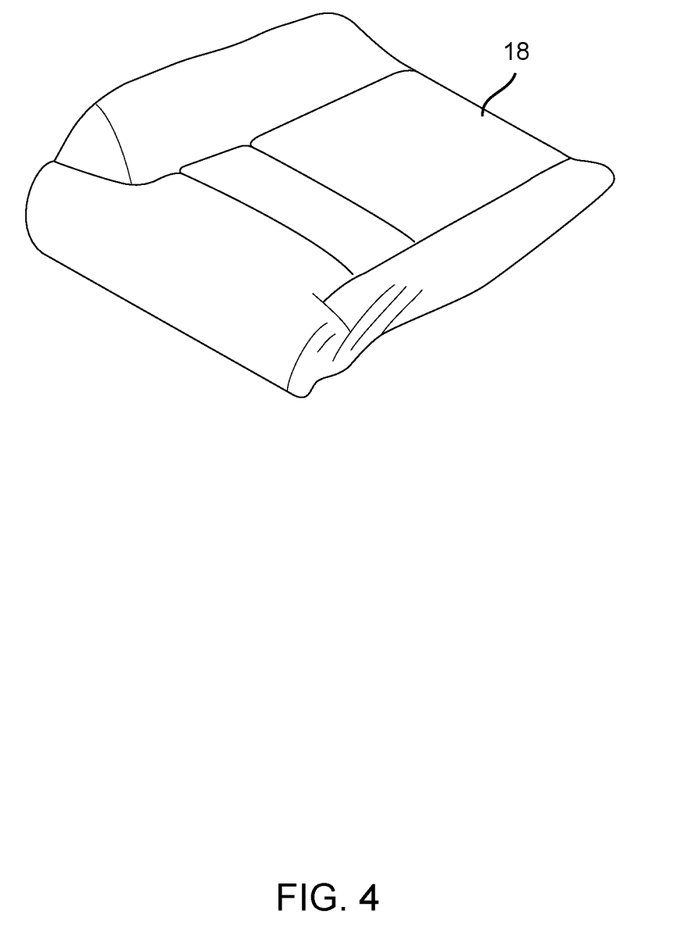
FIG. 4 is a schematic diagram illustrating one exemplary embodiment of the seat bottom cushion carrier module of the modular vehicle seat assembly provided herein.
Figure 7:
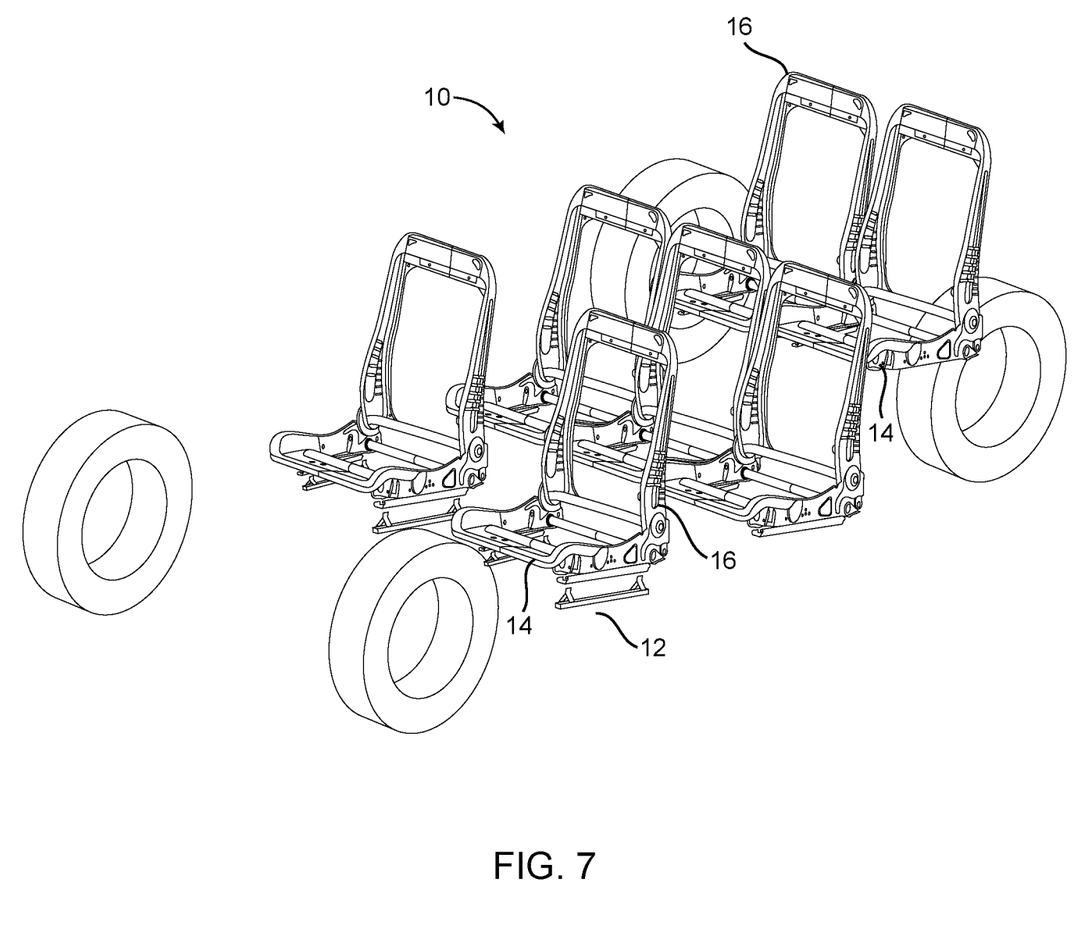
FIG. 7 is a schematic diagram illustrating an exemplary vehicle seating configuration utilizing the modular vehicle seat assembly provided herein.

FIG. 7 illustrates one exemplary configuration of the modular vehicle seat assembly 10 described herein, in a traditional vehicle utilizing three rows of seats. In such a configuration, the front seats can each utilize a seat base module 12, providing height adjustment capability, a seat bottom structure module 14, providing translational adjustment capability, and a seat back structure module 16, providing seat reclining capability. Various functional modules 22 (FIG. 6) can also be utilized in conjunction with the cushion carriers 18,20 (FIGS. 4 and 5). The second row seats can each utilize a seat base module 12, providing height adjustment capability, a seat bottom structure module 14, providing translational adjustment capability, and a seat back structure module 16, providing seat reclining capability. Various functional modules 22 can also be utilized in conjunction with the cushion carriers 18,20. Here, the middle second row seat can also omit the seat base module 12, with the seat bottom structure module 14 coupled to the adjacent seat bottom structures modules 14 in a bench-like configuration. The third row seats can each utilize a seat bottom structure module 14, optionally providing translational adjustment capability, and a seat back structure module 16, optionally providing seat reclining capability. Various functional modules 22 can also be utilized in conjunction with the cushion carriers 18,20. In this third row, the seat bottom structure modules 14 are secured directly to the underlying vehicle structure, without the use of an intervening seat base module 12.

Figure 8:
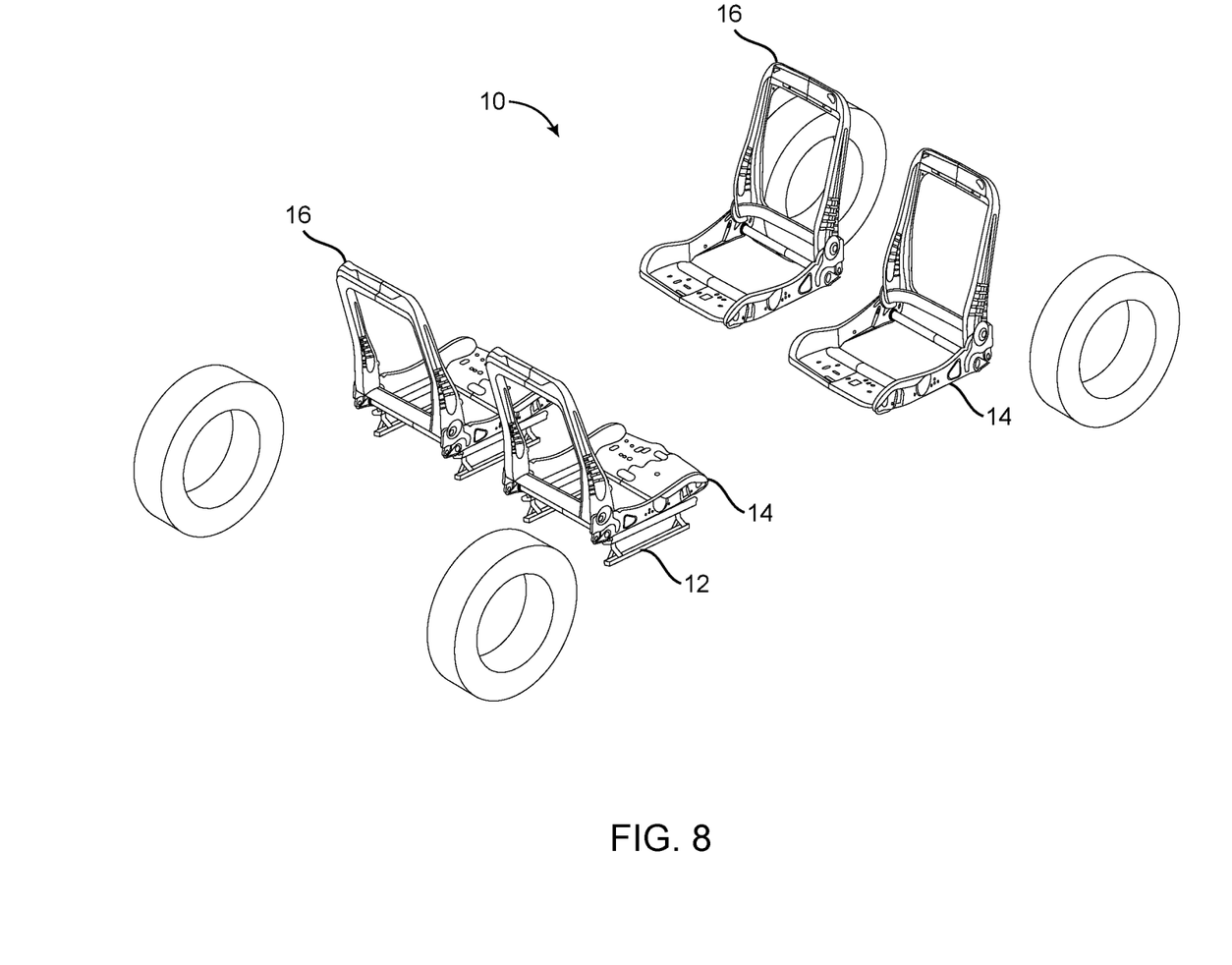
FIG. 8 is a schematic diagram illustrating another exemplary vehicle seating configuration utilizing the modular vehicle seat assembly provided herein.

FIG. 8 illustrates another exemplary configuration of the modular vehicle seat assembly 10 described herein, in an AD vehicle utilizing rows of rear and front-facing seats. In such a configuration, the rear-facing front seats can each utilize a seat base module 12, providing height adjustment capability, a seat bottom structure module 14, providing translational adjustment capability, and a seat back structure module 16, providing seat reclining capability. Various functional modules 22 (FIG. 6) can also be utilized in conjunction with the cushion carriers 18,20 (FIGS. 4 and 5). The front-facing rear seats can each utilize a seat bottom structure module 14, optionally providing translational adjustment capability, and a seat back structure module 16, optionally providing seat reclining capability. Various functional modules 22 can also be utilized in conjunction with the cushion carriers 18,20. In this front-facing rear row, the seat bottom structure modules 14 are secured directly to the underlying vehicle structure, without the use of an intervening seat base module 12.

Figure 9:
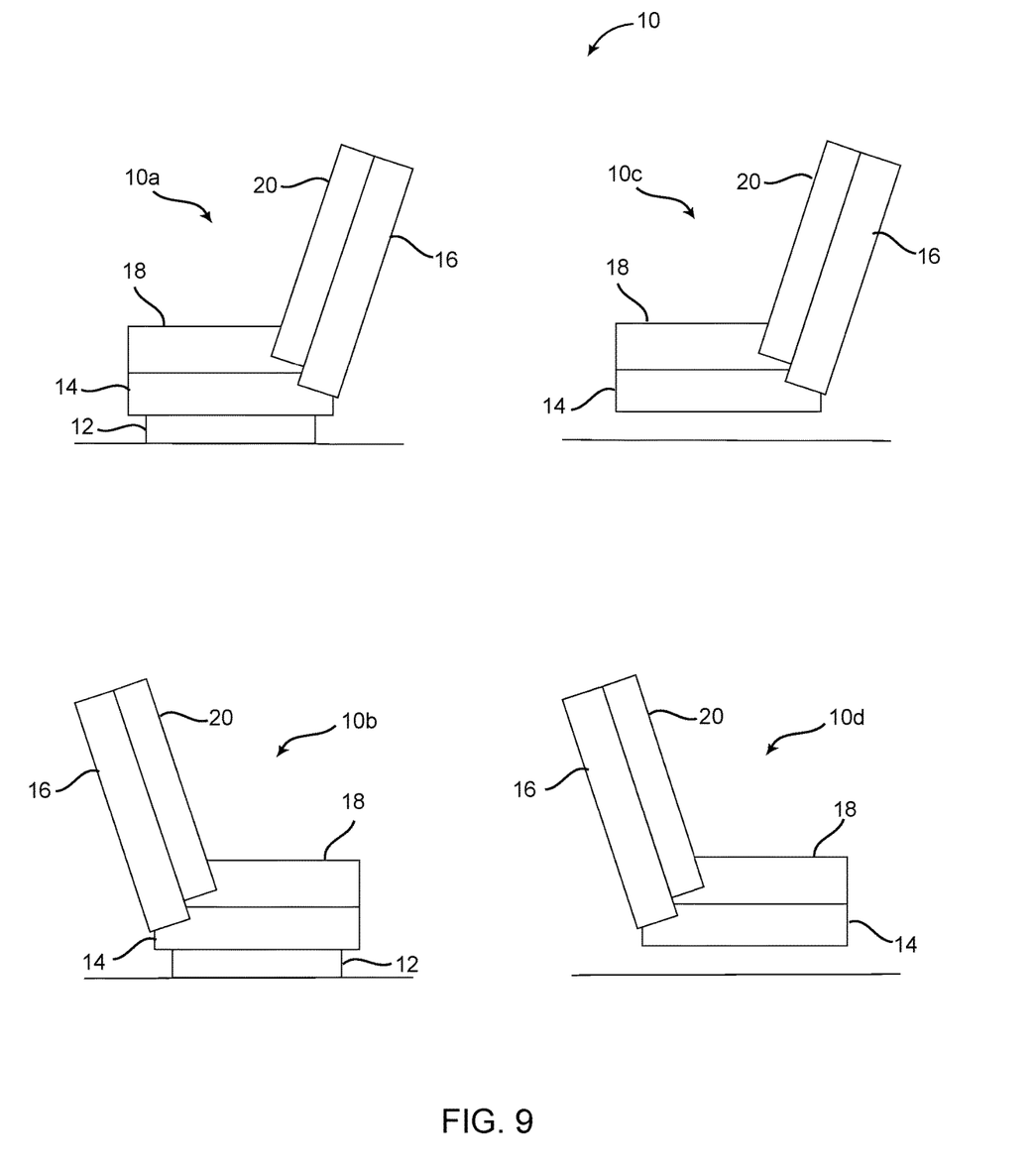
FIG. 9 is a schematic diagram illustrating exemplary front seat vehicle seating configurations utilizing the modular vehicle seat assembly provided herein.

FIG. 9 illustrates a variety of front seats that can be assembled using the modular vehicle seat assembly 10 provided herein. Front seat 10a is fully adjustable (elevation, translation, and recline) and utilizes the seat base module 12, the seat bottom structure module 14, the seat back structure module 16, the seat bottom cushion carrier module 18, and the seat back cushion carrier module 20. Front seat 10b is rear facing and fully adjustable (elevation, translation, and recline) and utilizes the seat base module 12, the seat bottom structure module 14, the seat back structure module 16, the seat bottom cushion carrier module 18, and the seat back cushion carrier module 20. Front seat 10c is secured to the tunnel console and is partially adjustable (translation and recline) and utilizes the seat bottom structure module 14, the seat back structure module 16, the seat bottom cushion carrier module 18, and the seat back cushion carrier module 20. Front seat 10d is secured to the tunnel console, rear facing, and partially adjustable (translation and recline) and utilizes the seat bottom structure module 14, the seat back structure module 16, the seat bottom cushion carrier module 18, and the seat back cushion carrier module 20.

Figure 10:
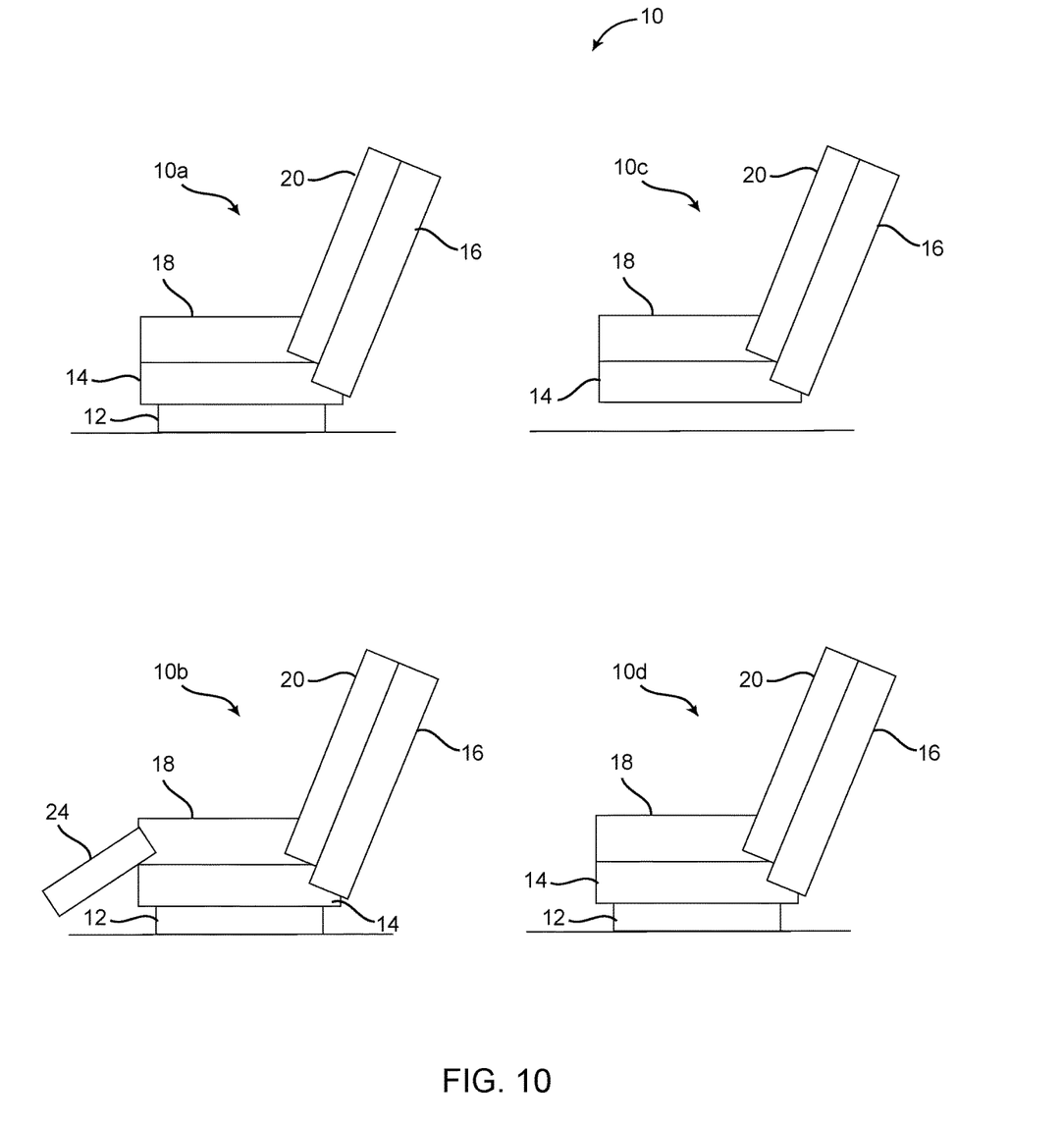
FIG. 10 is a schematic diagram illustrating exemplary second row seat vehicle seating configurations utilizing the modular vehicle seat assembly provided herein.

FIG. 10 illustrates a variety of second row seats that can be assembled using the modular vehicle seat assembly 10 provided herein. Seat 10a is fully adjustable (elevation, translation, and recline) and utilizes the seat base module 12, the seat bottom structure module 14, the seat back structure module 16, the seat bottom cushion carrier module 18, and the seat back cushion carrier module 20. Seat 10b is fully adjustable (elevation, translation, and recline) and utilizes the seat base module 12, the seat bottom structure module 14, the seat back structure module 16, the seat bottom cushion carrier module 18, and the seat back cushion carrier module 20. Further, seat 10b utilizes a modular leg rest attachment 24. Seat 10c is secured to the tunnel console and is partially adjustable (translation and recline) and utilizes the seat bottom structure module 14, the seat back structure module 16, the seat bottom cushion carrier module 18, and the seat back cushion carrier module 20. Seat 10d is narrow and fully adjustable (elevation, translation, and recline) and utilizes the seat base module 12, the seat bottom structure module 14, the seat back structure module 16, the seat bottom cushion carrier module 18, and the seat back cushion carrier module 20.

Figure 11:
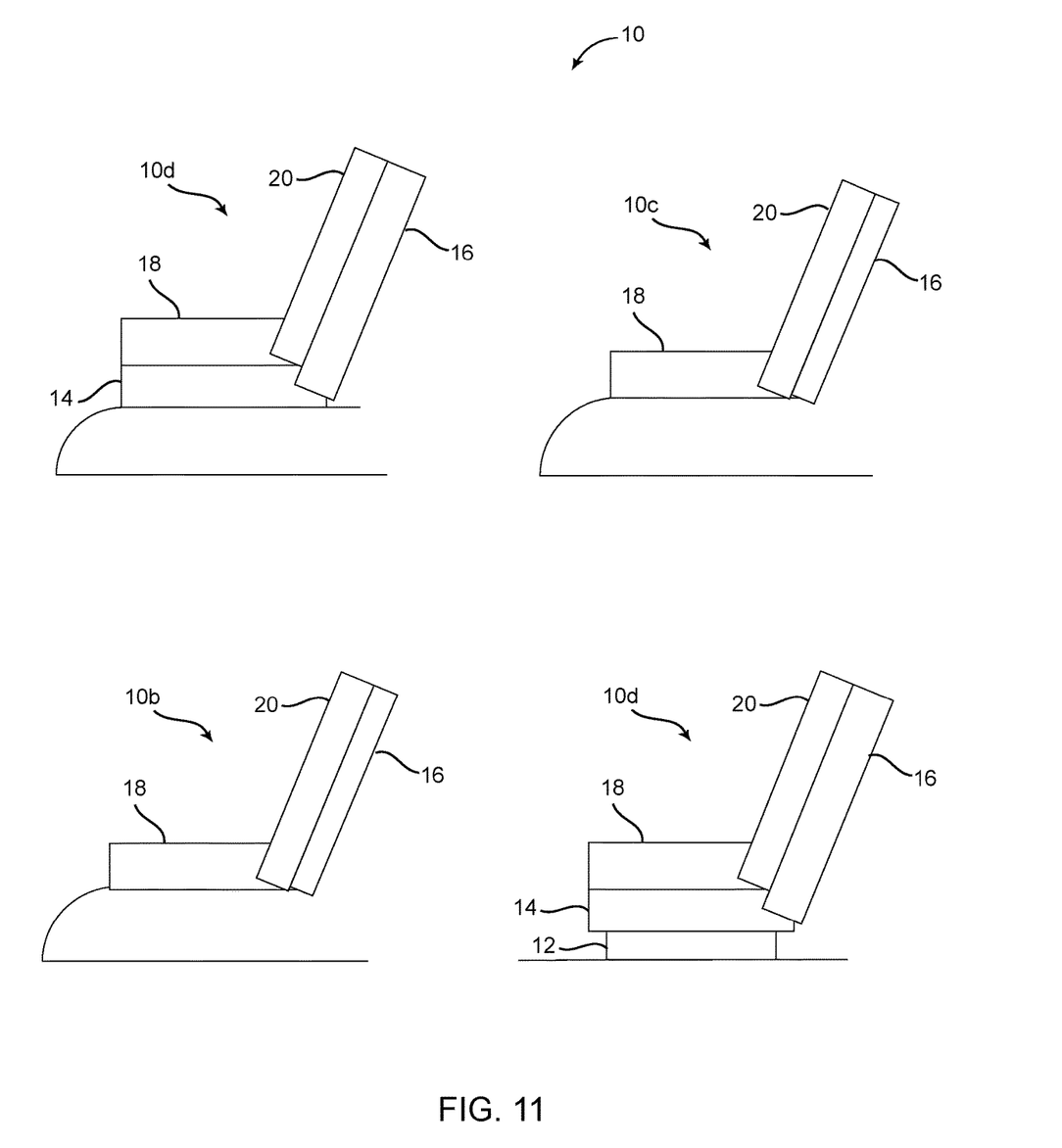
FIG. 11 is a schematic diagram illustrating further exemplary second row seat vehicle seating configurations utilizing the modular vehicle seat assembly provided herein.

FIG. 11 illustrates a variety of second row seats that can be assembled using the modular vehicle seat assembly 10 provided herein, for a "low" vehicle application or the like. Seat 10a is partially adjustable (translation and recline) and utilizes the seat bottom structure module 14, the seat back structure module 16, the seat bottom cushion carrier module 18, and the seat back cushion carrier module 20. Seat 10b is partially adjustable (recline) and utilizes the seat back structure module 16, the seat bottom cushion carrier module 18, and the seat back cushion carrier module 20. Seat 10c is secured to the tunnel console and is partially adjustable (recline) and utilizes the seat back structure module 16, the seat bottom cushion carrier module 18, and the seat back cushion carrier module 20. Seat 10d is luxury and fully adjustable (elevation, translation, and recline) and utilizes the seat base module 12, the seat bottom structure module 14, the seat back structure module 16, the seat bottom cushion carrier module 18, and the seat back cushion carrier module 20. Further, seat 10d can utilize a luxury armrest module, a child safety seat module, and a refrigerator console module (not illustrated).

Figure 12:
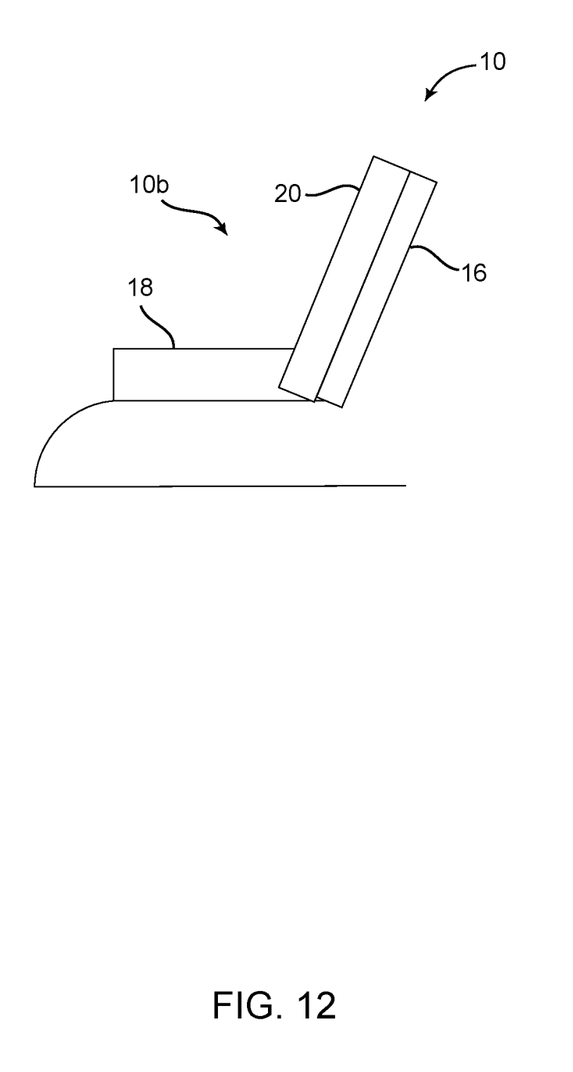
FIG. 12 is a schematic diagram illustrating exemplary third row seat vehicle seating configurations utilizing the modular vehicle seat assembly provided herein.

FIG. 12 illustrates a third row seat 10a that can be assembled using the modular vehicle seat assembly 10 provided herein. Seat 10a is partially adjustable (recline) and utilizes the seat back structure module 16, the seat bottom cushion carrier module 18, and the seat back cushion carrier module 20. Seat 10a is again coupled to the tunnel console, can be foldable, and, optionally, represents a "sofa" configuration.

Again, the present invention provides seat modules that are usable across all vehicle platforms so that specific seat configurations can rapidly be assembled in a vehicle. A common underlying structure is thereby provided, on which a unique "top hat," or finish package, and upholstery can then be applied. This "top hat" can be tailored to customer needs and demands, without limiting the common underlying structure. In other words, a common seat foundation is provided, from which many custom seats can be built for many vehicle platforms and applications. This is especially useful for both traditional and autonomous driving (AD) platforms. Seat commonality is provided for the smallest electric vehicle (EV) to the largest sport utility vehicle (SUV) to the most unconventional robot taxi. Modules, as opposed to finished seats, can be purchased from various suppliers and assembled as needed in a manufacturing facility, thereby saving expense and time.

Although the present invention is illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the present invention, are contemplated thereby, and are intended to be covered by the following non-limiting claims for all purposes.

What is claimed is:

1. A modular vehicle seat assembly, comprising:
a seat bottom structure module, a seat back structure module, a seat bottom cushion carrier module, and seat back cushion carrier module;
wherein the seat bottom structure module is adapted to be rigidly or translatably coupled to a seat base module on a bottom side of the seat bottom structure module and wherein the seat bottom structure module is adapted to be rigidly or translatably coupled directly to a structure of a vehicle on the bottom side of the seat bottom structure module, wherein the seat bottom structure module is adapted to be securely coupled to the seat bottom cushion carrier module on a top side of the seat bottom structure module, and wherein the seat bottom structure module is adapted to be rigidly or pivotably coupled to the seat back structure module on one or more of a top side and a back side of the seat bottom structure module;
wherein the seat back structure module is adapted to be rigidly or pivotably coupled to the seat bottom structure module on a bottom side of the seat back structure module, securely coupled to the seat back cushion carrier module on a front side of the seat back structure module, and translatably coupled to a head rest on a top side of the seat back structure module;
wherein the seat bottom cushion carrier module is adapted to be securely coupled to the top side of the seat bottom structure module on a bottom side of the seat bottom cushion carrier module, wherein the seat bottom cushion carrier module comprises a seat bottom cushion support member that is securely coupled to the top side of the seat bottom structure module and a seat bottom cushion; and
wherein the seat back cushion carrier module is adapted to be securely coupled to the front side of the seat back structure module on a back side of the seat back cushion carrier module, wherein the seat back cushion carrier module comprises a seat back cushion support member and a seat back cushion.

2. The modular vehicle seat assembly of claim 1, further comprising the seat base module adapted to be rigidly coupled to the structure of the vehicle on a bottom side of the seat base module and to the seat bottom structure module on a top side of the seat base module.

3. The modular vehicle seat assembly of claim 2, wherein the seat base module comprises one of a mechanical and an electromechanical elevation mechanism adapted to vary the height of the seat bottom structure module with respect to one or more of the seat base module and the structure of the vehicle.

4. The modular vehicle seat assembly of claim 1, wherein the seat bottom structure module comprises one of a mechanical and an electromechanical translation mechanism adapted to translatably couple the seat bottom structure module to the one of the seat base module and the structure of the vehicle.

5. The modular vehicle seat assembly of claim 1, wherein the seat bottom structure module comprises a vibration damper mechanism adapted to dampen vibration of the seat bottom structure module with respect to the one of the seat base module and the structure of the vehicle.

6. The modular vehicle seat assembly of claim 1, wherein the seat back structure module comprises one of a mechanical and an electromechanical reclining mechanism adapted to pivotably couple the seat back structure module to the seat bottom structure module.

7. The modular vehicle seat assembly of claim 1, further comprising one or more of a seat back cover securely coupled to a back side of the seat back structure module and a side impact air bag assembly securely coupled to a side of the seat back structure module.

8. The modular vehicle seat assembly of claim 1, wherein the seat bottom cushion carrier module is further adapted to receive one or more of a tilt module, an extension module, comfort module, an occupant detection module, and a safety module within or on an interior portion or exterior portion thereof.

9. The modular vehicle seat assembly of claim 1, wherein the seat back cushion carrier module is further adapted to receive one or more of a comfort module, an occupant detection module, and a safety module within or on an interior portion or exterior portion thereof.

10. A modular vehicle seat method, comprising:
given the modular vehicle seat assembly of claim 1:
rigidly or translatably coupling the seat bottom structure module to one of the seat base module and the structure of the vehicle on the bottom side of the seat bottom structure module, the seat bottom structure module adapted to be securely coupled to the seat bottom cushion carrier module on the top side of the seat bottom structure module and rigidly or pivotably coupled to the seat back structure module on one or more of the top side and the back side of the seat bottom structure module;
rigidly or pivotably coupling the seat back structure module to the seat bottom structure module on the bottom side of the seat back structure module, the seat back structure module adapted to be securely coupled to the seat back cushion carrier module on the front side of the seat back structure module and translatably coupled to the head rest on the top side of the seat back structure module;
securely coupling the bottom side of the seat bottom cushion carrier module to the top side of the seat bottom structure module, wherein the seat bottom cushion carrier module comprises the seat bottom cushion support member that is securely coupled to the top side of the seat bottom structure module and the seat bottom cushion; and
securely coupling the back side of the seat back cushion carrier to the front side of the seat back structure module, wherein the seat back cushion carrier module comprises the seat back cushion support member and the seat back cushion.

11. The modular vehicle seat method of claim 10, further comprising rigidly coupling the seat base module to the structure of the vehicle on a bottom side of the seat base module and to the seat bottom structure module on a top side of the seat base module.

12. The modular vehicle seat method of claim 11, wherein the seat base module comprises one of a mechanical and an electromechanical elevation mechanism adapted to vary the height of the seat bottom structure module with respect to one or more of the seat base module and the structure of the vehicle.

13. The modular vehicle seat method of claim 10, wherein the seat bottom structure module comprises one of a mechanical and an electromechanical translation mechanism adapted to translatably couple the seat bottom structure module to the one of the seat base module and the structure of the vehicle.

14. The modular vehicle seat method of claim 10, wherein the seat back structure module comprises one of a mechanical and an electromechanical reclining mechanism adapted to pivotably couple the seat back structure module to the seat bottom structure module.

15. The modular vehicle seat method of claim 10, further comprising securely coupling one or more of a seat back cover to a back side of the seat back structure module and a side impact air bag assembly to a side of the seat back structure module.

16. The modular vehicle seat method of claim 10, further comprising disposing one or more of a tilt module, an extension module, comfort module, an occupant detection module, and a safety module within or on an interior portion or exterior portion of the seat bottom cushion carrier module.

17. The modular vehicle seat method of claim 10, further comprising disposing one or more of a comfort module, an occupant detection module, and a safety module within or on an interior portion or exterior portion of the seat back cushion carrier module.

18. A modular vehicle seat assembled by the process comprising:
given the modular vehicle seat assembly of claim 1:
rigidly or translatably coupling the seat bottom structure module to one of the seat base module and the structure of the vehicle on the bottom side of the seat bottom structure module, the seat bottom structure module adapted to be securely coupled to the seat bottom cushion carrier module on the top side of the seat bottom structure module and rigidly or pivotably coupled to the seat back structure module on one or more of the top side and the back side of the seat bottom structure module;
rigidly or pivotably coupling the seat back structure module to the seat bottom structure module on the bottom side of the seat back structure module, the seat back structure module adapted to be securely coupled to the seat back cushion carrier module on the front side of the seat back structure module and translatably coupled to the head rest on the top side of the seat back structure module;
securely coupling the bottom side of the seat bottom cushion carrier module to the top side of the seat bottom structure module, wherein the seat bottom cushion carrier module comprises the seat bottom cushion support member that is securely coupled to the top side of the seat bottom structure module and the seat bottom cushion; and
securely coupling the back side of the seat back cushion carrier to the front side of the seat back structure module, wherein the seat back cushion carrier module comprises the seat back cushion support member and the seat back cushion.

19. The modular vehicle seat of claim 18, wherein the process further comprises rigidly coupling the seat base module to the structure of the vehicle on a bottom side of the seat base module and to the seat bottom structure module on a top side of the seat base module.

20. The modular vehicle seat of claim 18, wherein the process further comprises securely coupling one or more of a seat back cover to a back side of the seat back structure module and a side impact air bag assembly to a side of the seat back structure module.

21. The modular vehicle seat of claim 18, wherein the process further comprises disposing one or more of a tilt module, an extension module, comfort module, an occupant detection module, and a safety module within or on an interior portion or exterior portion of the seat bottom cushion carrier module.

22. The modular vehicle seat of claim 18, wherein the process further comprises disposing one or more of a comfort module, an occupant detection module, and a safety module within or on an interior portion or exterior portion of the seat back cushion carrier module.

\* \* \* \* \*